(12) United States Patent
Nording et al.

(10) Patent No.: US 9,416,700 B2
(45) Date of Patent: Aug. 16, 2016

(54) SOUND GENERATOR FOR A SYSTEM FOR INFLUENCING EXHAUST NOISE OF A MOTOR VEHICLE

(71) Applicant: Eberspächer Exhaust Technology GmbH & Co. KG, Neunkirchen (DE)

(72) Inventors: Thomas Nording, Esslingen (DE); Thomas Schlicht, Esslingen (DE); Konrad Klausa, Deizisau (DE); Frank Sauter, Leinfelden-Echterdingen (DE)

(73) Assignee: Eberspächer Exhaust Technology GmbH & Co. KG, Neunkirchen (DE)

(*) Notice: Subject to any disclaimer, the term of this patent is extended or adjusted under 35 U.S.C. 154(b) by 0 days.

(21) Appl. No.: 14/565,840

(22) Filed: Dec. 10, 2014

(65) Prior Publication Data

US 2015/0159527 A1    Jun. 11, 2015

(30) Foreign Application Priority Data

Dec. 10, 2013   (DE) .......................... 10 2013 113 803

(51) Int. Cl.
| | |
|---|---|
| *F01N 1/06* | (2006.01) |
| *B60K 13/04* | (2006.01) |
| *F01N 13/18* | (2010.01) |
| *F16L 55/033* | (2006.01) |

(52) U.S. Cl.
CPC ............... *F01N 1/065* (2013.01); *B60K 13/04* (2013.01); *F01N 13/1888* (2013.01); *F16L 55/0333* (2013.01)

(58) Field of Classification Search
CPC ...................................................... F01N 1/065
USPC ................................. 181/206; 381/71.1, 71.4
See application file for complete search history.

(56) References Cited

U.S. PATENT DOCUMENTS

| | | | |
|---|---|---|---|
| 2009/0255754 A1 | 10/2009 | Kruger et al. | |
| 2012/0308023 A1* | 12/2012 | Luecking | F01N 1/065 381/71.5 |
| 2013/0202148 A1 | 8/2013 | Grupp et al. | |

FOREIGN PATENT DOCUMENTS

| | | |
|---|---|---|
| DE | 10 2008 018 085 A1 | 10/2009 |
| DE | 10 2009 049 280 A1 | 4/2011 |
| DE | 10 2011 089 283 A1 | 6/2013 |
| DE | 10 2012 201 725 A1 | 8/2013 |

* cited by examiner

Primary Examiner — Jeremy Luks
(74) Attorney, Agent, or Firm — McGlew and Tuttle, P.C.

(57) ABSTRACT

A sound generator, for a system for influencing sound waves propagating through an exhaust system of a vehicle driven by an internal combustion engine, includes an enclosure comprised of an upper shell and a lower shell. A bell mouth, supported by the lower shell and penetrating the lower shell, is configured for a fluid communication with the exhaust system. A loudspeaker is disposed in the enclosure and supported by the bell mouth. The lower shell of the enclosure supports the upper shell of the enclosure. The bell mouth is solely supported by the lower shell of the enclosure. The lower shell may include at least one air-tight feed-through for a control wire connected to the loudspeaker and/or at least one pressure equalizing valve. An anti-sound system is provided that includes the sound generator and a vehicle is provided with the anti-sound system.

23 Claims, 3 Drawing Sheets

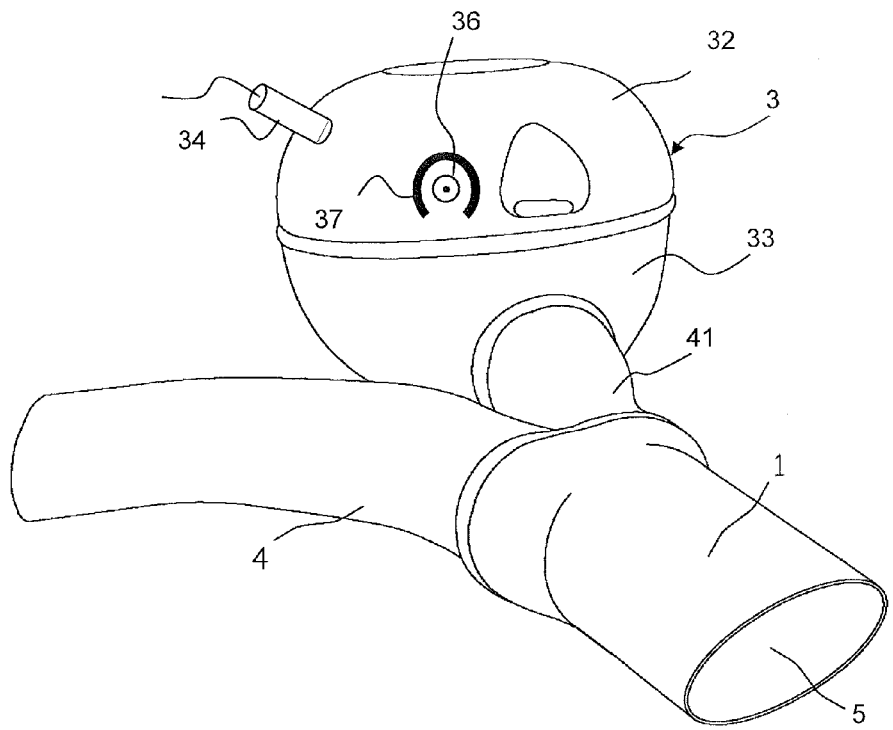
Figure 1A - Prior Art
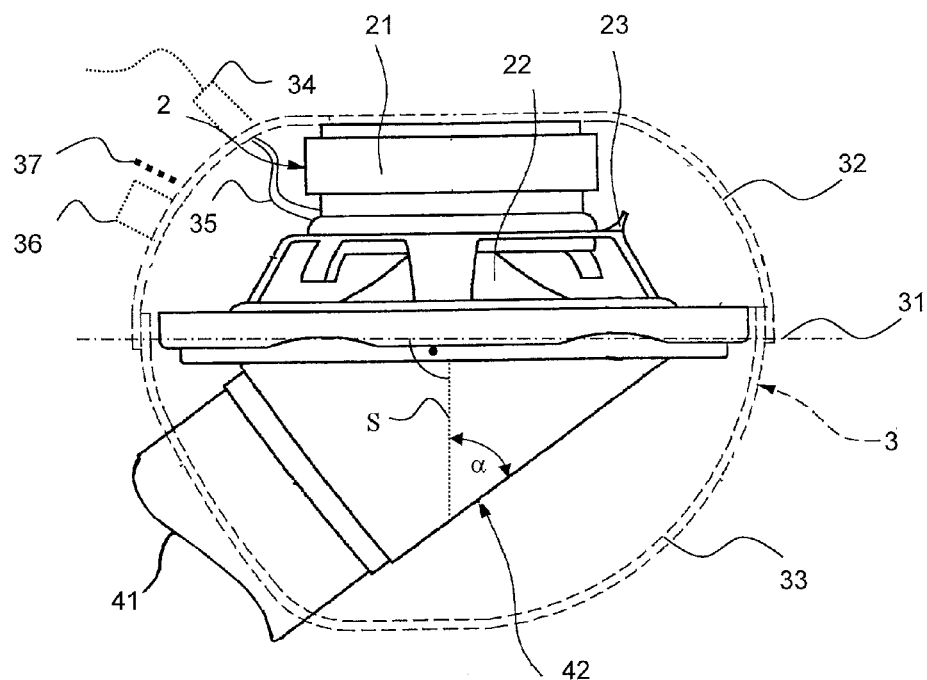
Figure 1B - Prior Art

SOUND GENERATOR FOR A SYSTEM FOR INFLUENCING EXHAUST NOISE OF A MOTOR VEHICLE

CROSS REFERENCE TO RELATED APPLICATIONS

The present application claims priority of Patent Application No. 10 2013 113 803.9, filed Dec. 10, 2013 in Germany, the entire contents of which are incorporated by reference herein.

FIELD OF THE INVENTION

The invention concerns a sound generator for a system for influencing sound propagating through exhaust systems of vehicles driven by internal combustion engines.

BACKGROUND OF THE INVENTION

Regardless of the type of an internal combustion engine (for example reciprocating piston engine, pistonless rotary engine or free-piston engine), noises are generated as a result of the successively executed strokes (in particular intake and compression of the fuel-air mixture, combustion and discharge of the combusted fuel-air mixture). On the one hand, the noises propagate through the internal combustion engine in the form of solid-borne sound and are emitted on the outside of the internal combustion engine in the form of airborne sound. On the other hand, the noises propagate in the form of airborne sound together with the combusted fuel-air mixture through an exhaust system that is in fluid communication with the internal combustion engine. The noise propagating through the exhaust system in form of airborne sound is referred to as exhaust noise.

These noises are often regarded as being disadvantageous. On the one hand, there are statutory provisions on protection against noise to be observed by manufacturers of vehicles driven by internal combustion engines. These statutory provisions normally specify a maximum sound pressure for an operation of a vehicle. Manufacturers, on the other hand, try to impart a characteristic noise emission to internal combustion engine driven vehicles of their production, with the noise emission fitting the image of the respective manufacturer and being popular with customers. Present-day engines with small displacement often cannot naturally generate such intended characteristic noise.

The noises propagating through the internal combustion engine in the form of solid-borne sound can be muffled quite well and are thus usually no problem as far as protection against noise is concerned.

The noises traveling through the exhaust system of the internal combustion engine together with the combusted fuel-air mixture in the form of airborne sound are reduced by exhaust mufflers located ahead of the exhaust system discharge opening (tailpipe) and downstream of catalytic converters, if present. Respective mufflers may for instance work according to the absorption and/or reflection principle. The disadvantage of both operating principles is that they require a comparatively large volume and create a comparatively high resistance to the combusted fuel-air mixture, resulting in a drop of the overall efficiency of the vehicle and in increased fuel consumption.

For quite some time, so-called anti-noise systems have been developed as an alternative or supplement to mufflers. Anti-noise systems superimpose electro-acoustically generated anti-noise on airborne noise generated by the internal combustion engine and propagated through the exhaust system. Respective anti-noise systems typically use a so-called Filtered-X, Least Mean Squares (FxLMS) algorithm trying to bring the airborne noise propagating through the exhaust system down to zero (in the case of noise-cancellation) or to a preset threshold (in the case of influencing noise) by outputting sound using at least one loudspeaker. The loudspeaker is usually in fluid communication with the exhaust system. For achieving a completely destructive interference between the sound waves of the airborne sound propagating through the exhaust system and the anti-noise generated by the loudspeaker, the sound waves originating from the loudspeaker have to match the sound waves propagating through the exhaust system in amplitude and frequency with a relative phase shift of 180 degrees. If the sound waves of the airborne noise propagating through the exhaust system match the anti-noise sound waves generated at the loudspeaker in frequency and have a phase shift of 180 degrees relative thereto, but do not match in amplitude, only an attenuation of the sound waves of the airborne sound propagating through the exhaust system results. The anti-noise is calculated separately for each frequency band of the airborne noise propagating through the exhaust pipe using the FxLMS-algorithm by determining a proper frequency and phasing of two sine oscillations being shifted with respect to each other by 90 degrees, and by calculating the required amplitudes for these sine oscillations. The objective of anti-noise systems is that the cancellation or influencing of sound is audible and measurable at least outside of the exhaust system. As the case may be, the cancellation or influencing of sound is audible and measurable also inside the exhaust system.

A system for influencing sound waves propagating through an exhaust system of a vehicle driven by an internal combustion engine will be described below with reference to FIGS. 1A and 1B.

A system's sound generator 3 shown in the schematic perspective view of FIG. 1A comprises a solid two-part enclosure formed by an upper shell 32 and a lower shell 33 which are joined together in an air-tight manner. The enclosure houses an electrodynamic loudspeaker 2 and is connected to an exhaust system 4 by a Y-pipe 1. The Y-pipe 1 comprises a discharge opening 5 at the base of the "Y" for discharging exhaust gases flowing through the exhaust system 4 and sound generated by the loudspeaker 2. By having the connection implemented with the Y-pipe, the thermal stress of the loudspeaker 2 disposed within the sound generator 3 that is caused by the exhaust gases flowing through the exhaust system 4 is kept low. This is required because conventional loudspeakers are configured for an operation within a range of up to a maximum of 200° C. only, while the temperature of the exhaust gases flowing through the exhaust system 4 may be up to between 400° C. and 700° C. A pressure equalizing valve 36 is disposed on the upper shell 32 of the enclosure. The pressure equalizing valve 36 ensures that a pressure inside the enclosure corresponds approximately to a pressure outside of the enclosure. In order to protect the valve 36 disposed on the surface of the upper shell 32 against damage, the upper shell 32 further holds a cast metal ring 37 surrounding the valve 36. The ring 37 has a slot at its bottom for enabling a liquid to drain off from the region surrounded by the ring 37. Finally, the upper shell 32 holds a cable bushing 34 through which connecting wires are fed-through into the inside of the sound generator 3.

FIG. 1B shows a schematic cross section through the sound generator 3 of FIG. 1A. As can be seen, the loudspeaker 2 is a voice coil type loudspeaker 2 comprising a permanent magnet 21, and a funnel-like membrane 22 which are together supported by a loudspeaker basket 23. Hereby, the membrane 22 is connected at its radial outside to the loudspeaker basket 23 by an elastic surround (not shown) and comprises at its radial inside a voice coil (not shown) that moves in bores formed in the permanent magnet 21. By applying an alternating current to the voice coil, force is exerted onto the membrane 22 by the voice coil due to a Lorentz force, causing the membrane 22 to oscillate. The control signals required for operating the voice coil are supplied through the cable bushing 34 disposed on the upper shell 32 of the enclosure by wires 35. The loudspeaker basket 23 is at its radial outside supported by a bell mouth 42 that is connected to the Y-pipe 1 via a connecting pipe 41. The use of bell mouth 42 is required, since the area of the loudspeaker's 2 membrane 22 is larger than the cross-sectional area of the exhaust system 4 in the sound coupling region. The large area of the membrane 22 is necessary to achieve the required sound energy flux. The funnel-like membrane 22 defines an axis of symmetry S forming an angle of 33° with the bottom of the bell mouth 42. The axis of symmetry S is perpendicular to a parting plane 31 along which the enclosure's upper shell 32 and lower shell 33 are joined together. The elastic surround of the loudspeaker 2 is as a matter of fact located in said parting plane 31.

A detriment of the above structure is its sizable overall volume. Due to numerous restrictive installation space conditions in the undercarriage of a vehicle as well as in a vehicle's engine compartment housing the intake system, a corresponding mounting space is only available to a limited extent. Since systems for influencing the sound waves propagating through an exhaust system of a vehicle driven by an internal combustion engine require considerable sound energy fluxes, it is not possible to just reduce the diameter of the loudspeaker. The area of the membrane is instead required to be equal to or larger than the cross sectional area of the exhaust system or the intake system in the sound coupling region. This in turn requires use of a bell mouth at the junction between the membrane of the loudspeaker and the fitting connecting to the exhaust system or intake system.

With the above construction, mounting an above structure proved further to be laborious with the cable bushing and the fed-through wires being frequently damaged. Finally, the pressure equalizing valve having the ring surrounding is expensive to produce because of the numerous individual operations required for its manufacture.

SUMMARY OF THE INVENTION

It is therefore desirable to provide a sound generator for a system for influencing exhaust noise of vehicles driven by internal combustion engines that has a compact overall volume while providing a high sound energy flux. The sound generator is further supposed to be manufactured at a reasonable price and robust when mounted and in use.

Embodiments of a sound generator for a system for influencing sound waves propagating through exhaust systems of vehicles driven by internal combustion engines comprise an enclosure, a bell mouth, and a loudspeaker. The enclosure is comprised of an upper shell and a lower shell which are in particular joined in an airtight manner. The bell mouth is supported by the lower shell of the enclosure and penetrates a wall of the lower shell. In the region where the lower shell is penetrated, the bell mount is joined (jointed, connected) to the lower shell particularly in an airtight manner. The bell mouth is configured for being arranged in fluid communication with the exhaust system. The loudspeaker is disposed inside the enclosure and is supported by the bell mouth. The lower shell of the enclosure supports the upper shell of the enclosure. The lower shell comprises at least one air-tight feed-through for a control wire connected to the loudspeaker and/or at least one pressure equalizing valve disposed in a dimple shaped by forming the lower shell.

Hence, the bell mouth holds not only the loudspeaker but, by means of the lower shell penetrated by the bell mouth, also holds the complete sound generator. By having the feed-through for the control wire formed on the lower shell supported on the bell mouth, the control wire is exposed to the same vibration characteristics during operation of the vehicle as the loudspeaker also supported on the bell mouth. This results in less stress to the control wires fed through the feed-through and thus in a reduced risk of malfunctions. By having the pressure equalizing valve disposed in a dimple of the lower shell, the lower shell itself protects it from being damaged. It is thus no longer necessary to provide a (separate) ring surrounding the pressure equalizing valve, thereby reducing the production costs. If the lower shell is made from sheet metal, the dimple may be formed easily by subjecting the lower shell to a forming processing or directly when shaping the lower shell. In case the lower shell is made from synthetic material, the dimple can be provided by appropriately designing the mold used. The upper shell does not support any components of the sound generator (such as the feed-through for the control wire) and serves only as protection for the components disposed inside the enclosure against influences from outside. It can therefore be mounted without having to pay any attention to cable feedthroughs or the like. Installation is eased hereby.

It is noted that lower shell and sound line enclose different volumes and represent thus different elements, also in case of a lower shell being joined permanently to a sound line or even formed integrally with it.

It is noted that lower shell and bell mouth enclose different volumes and represent thus different elements, also in case of a lower shell being joined permanently to the bell mouth or even formed integrally with it.

According to an embodiment, the at least one pressure equalizing valve is a throttle valve enabling a flow rate of more than 3.5 liters of air per hour and less than 10 liters of air per hour, and in particular of more than 4.5 liters of air per hour and less than 9.0 liters of air per hour, and further in particular of more than 5.0 liters of air per hour and less than 8.5 liters of air per hour for a constant pressure difference of 4 millibar (400 Pascal) between the two openings of the throttle valve. The constant pressure difference of 4 millibar is hereby only used for defining the flow capacity of the throttle valve. With the sound generator in operation, the pressure difference is not constant.

According to an embodiment, the loudspeaker comprises a loudspeaker basket, a membrane supported by the loudspeaker basket, a permanent magnet supported by the loudspeaker basket, and a voice coil supported by a voice coil carrier. The voice coil is disposed in a constant magnetic field generated with the permanent magnet and coupled to the membrane. The membrane has a rotationally symmetric shape.

According to an embodiment, a parting plane between the enclosure's upper shell and lower shell forms with the plane perpendicular to the axis of symmetry of the membrane an angle of more than 3° and less than 45°, and in particular of more than 5° and less than 30°, and further in particular of more than 8° and less than 15°. The parting plane formed between the lower shell and the upper shell of the membrane is thus tilted with respect to an alignment of the loudspeaker. In other words, the loudspeaker is not disposed in the parting plane but intersected by the parting plane at an angle of more 3°. This results in the upper side and the lower side of the loudspeaker being both accessible from the lower shell, although on opposed sides of the lower shell. This eases, for instance, the configuration of a cable feedthrough for a control wire of the loudspeaker in the lower shell. With the angle not exceeding 45°, ease of installation of the loudspeaker inside the lower shell when the upper shell is opened is guaranteed.

According to an embodiment, the axis of symmetry of the membrane forms an angle with a bottom of the bell mouth of between 35° and 60°, and in particular of between 38° and 55°, and further in particular between 40° and 50°. These ranges of angles guarantee both, a compact structure of the sound generator and a good propagation of the sound generated by the loudspeaker in the bell mouth.

According to an embodiment, the loudspeaker is attached to the bell mouth such that it separates an internal volume of the bell mouth from an internal volume of the enclosure in an air-tight manner. The loudspeaker thus divides an internal volume of the enclosure into a portion separated from the exhaust system and a portion being in fluid communication with the exhaust system (via the bell mouth). The internal volume of the enclosure which is enclosed by the loudspeaker, the (outer side of the) bell mouth and the enclosure, corresponds to the 10-fold to 100-fold, and in particular to the 15-fold to 60-fold, and further in particular to the 20-fold and the 50-fold of the air volume being at a max displaced by a membrane of the loudspeaker. Complying with this rule ensures that an internal volume separated from the exhaust system by the membrane of the loudspeaker is sufficiently large to prevent a too high attenuation of the membrane, while a sound generator with a small overall size is achieved. The air volume displaced by the membrane at a max (maximum) is hereby understood to be the air volume that may be moved by the loudspeaker when in operation according to specifications (i.e. in non-destructive operation) by applying a corresponding control signal.

According to an embodiment, the membrane of the loudspeaker is funnel-like, and in particular non-developable funnel-like (NAWI membrane) or dome-like, with the top or top face of the funnel-like membrane or the membrane with the non-developable shape facing towards the permanent magnet or the geometric center of the dome-like membrane facing towards the permanent magnet. The base area of the funnel-like or dome-like membrane or of the membrane having a non-developable shape thus faces away from the permanent magnet. Non-developable funnel-like or dome-like membranes are particularly rigid and therefore enable a full-area and uniform movement of the membrane. Alternatively, also a cone-like membrane may for instance be used.

According to an embodiment, the membrane is air-tight and coupled to the loudspeaker basket by an air-tight surround. This enables an adjustment of the oscillation behavior of the membrane by selection of proper materials and by dimensioning of the surround. Further, according to an embodiment surround and membrane are made from different materials.

According to an embodiment, the loudspeaker basket supports a centering device and in particular a centering spider connected to the voice coil carrier or to the membrane in the region of the voice coil carrier. It is noted that the provision of a centering device can be spared when a substantially frictionless guidance of the voice coil in the permanent magnet is effected.

According to an embodiment, the bell mouth comprises at least two, and in particular at least three protrusions configured for being connected to the lower shell of the enclosure.

Further, openings formed between the protrusions of the bell mouth and an inner wall of the lower shell enable air to flow from the lower shell of the enclosure into the upper shell of the enclosure. By this, a part of a sealed off internal volume, which is separated from the exhaust system by the membrane of the loudspeaker, can be located in the upper shell and another part of said volume can be located in the lower shell.

According to an embodiment, the upper shell and the lower shell of the enclosure are joined together in an air-tight manner by soldering, welding, crimping, riveting, adhesion or screwing.

According to an embodiment, the upper side of the enclosure is only attached to the lower side of the enclosure, but not to the bell mouth. Accordingly, the bell mouth is only attached to the lower shell of the enclosure but not to the upper side of the enclosure.

According to an embodiment, the enclosure in total resembles a form that comes close to the form of an oblique prism with a square shaped base, and in particular to that of a parallelepiped with its opposing faces being curved in opposite directions.

According to an embodiment, the upper shell and the lower shell each have a shape that comes close to the form of a right prism having a triangular shaped base, whereby opposing faces are curved in opposite directions.

Since only the membrane and maybe an edge of the loudspeaker basket are located in that part of the enclosure that is in fluid communication with the exhaust system, only these elements that are exposed to hot exhaust gases charged with corrosive chemicals. Aside from the inner wall of the bell mouth or enclosure, only these elements have therefore to be made from a material resistant to the exhaust gas and a possibly forming condensate. The other elements of the sound generator, and the delicate voice coil in particular which is already subject to a certain temperature stress caused by ohmic losses, are, however, protected from the exhaust gases by the membrane and the inner wall of the bell mouth or enclosure. This also reduces the risk of the voice coil being shorted by condensate arising from the exhaust gas and air that is taken in.

According to an embodiment, the loudspeaker basket is made from metal or synthetic material.

According to an embodiment, the upper shell and the lower shell of the sound generator's enclosure are made of sheet metal or synthetic material. Hereby, the materials for the upper shell and the lower shell of the enclosure may be the same or different.

According to an embodiment, the upper shell and the lower shell of the sound generator's enclosure as well as the bell mouth are rigid.

According to an embodiment, the membrane is made of metal, and in particular of aluminum or titanium, or of synthetic material, and in particular of aromatic polyamides.

According to an embodiment, the permanent magnet comprises rare earths, and in particular neodymium, and is in particular formed from a neodymium-iron-boron alloy.

According to an embodiment, the bell mouth is an element different from the upper shell and the lower shell of the enclosure. Thus, the bell mouth is provided in addition to the upper shell and lower shell of the enclosure. Thus, the bell mouth is distinct from both the lower shell and upper shell of the enclosure. At least a part of the bell mouth is located inside the enclosure. According to an embodiment, the bell mouth is permanently attached to the lower shell of the enclosure.

According to an embodiment, the bell mouth is formed by a duct connecting the sound generator to the exhaust system.

Embodiments of a system for influencing sound waves propagating through exhaust systems of vehicles driven by internal combustion engines comprise a controller and at least one sound generator as described above. The loudspeaker and especially the voice coil of the loudspeaker of the at least one sound generator is hereby electrically connected with the controller. The controller is configured to generate a control signal and to output the control signal to the loudspeaker and especially the voice coil of the loudspeaker of the at least one sound generator. The control signal is adapted to cancel sound inside the exhaust system at least partially or preferably completely in magnitude and phase upon the loudspeaker and especially the voice coil of the loudspeaker being operated with said control signal.

Embodiments of a motor vehicle comprise an internal combustion engine having an engine control unit, an exhaust system in fluid communication with the internal combustion engine and the system described above. The at least one sound generator of the system is hereby in fluid communication with the exhaust system. The controller of the system is further connected to the engine control unit of the internal combustion engine of the vehicle. By connecting the controller of the system to the engine control unit the controller can take values such as rotational speed and torque into account when generating the control signal for the loudspeaker.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1A is a schematic representation of a perspective view of a state of the art sound generator of a system for influencing sound waves propagating through exhaust systems of vehicles driven by internal combustion engines;

FIG. 1B is a schematic representation showing a cross section through a sound generator of FIG. 1A;

DESCRIPTION OF THE PREFERRED EMBODIMENTS

Figure 2A:
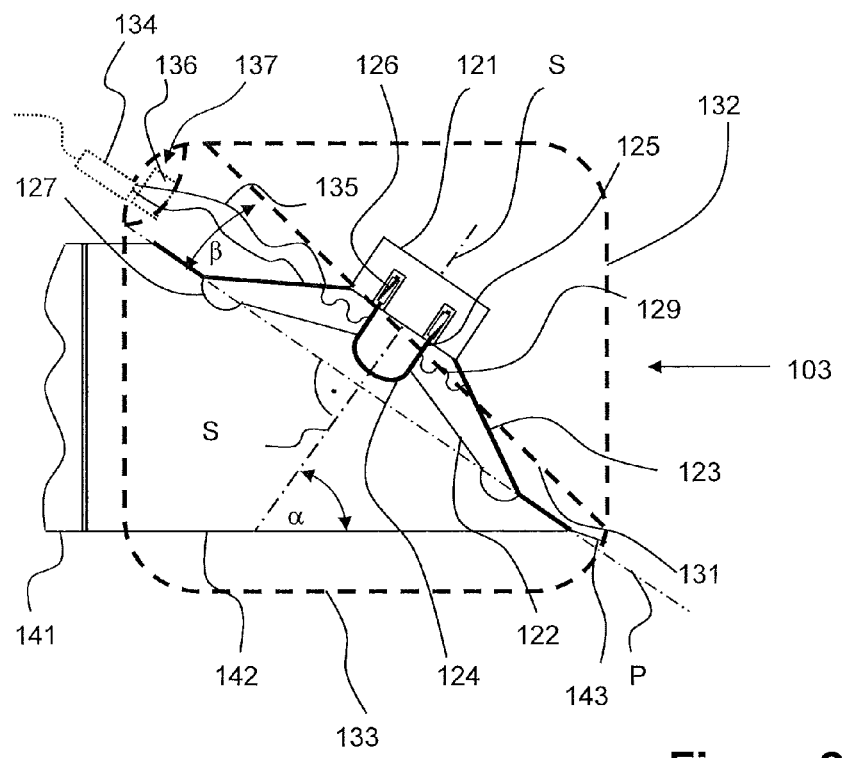
FIG. 2A is a schematic representation showing a cross section through a sound generator according to an embodiment of the invention for a system for influencing sound waves propagating through exhaust systems of vehicles driven by internal combustion engines.

Referring to the drawings, in the exemplary embodiments described below, components that are alike in function and structure are designated as far as possible by alike reference numerals. Therefore, to understand the features of the individual components of a specific embodiment, the descriptions of other embodiments and of the summary of the disclosure should be referred to.

Figure 2B:
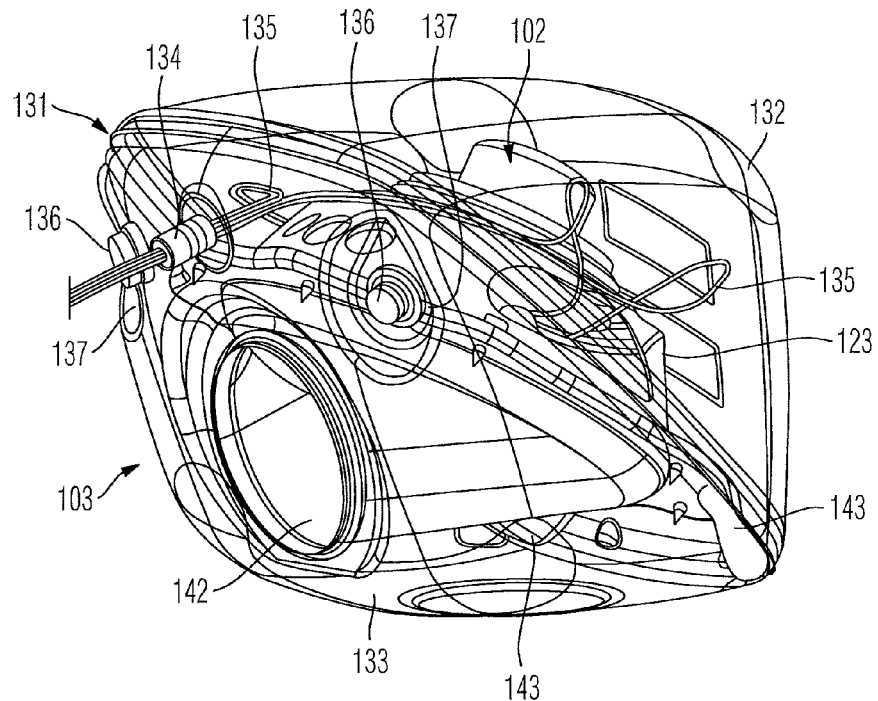
FIG. 2B is a schematic representation of a partly transparent perspective view of the sound generator of FIG. 2A.

Below, a sound generator according to an embodiment of the invention is described with respect to FIGS. 2A and 2B. The sound generator 103 is illustrated in FIG. 2A in a schematic cross-sectional view and illustrated in a perspective view in FIG. 2B. In FIG. 2B, the enclosure of the sound generator 103 formed by the lower shell 133 and the upper shell 132 is shown transparently.

The lower shell 133 and the upper shell 132, forming the enclosure of the sound generator 103, are in the embodiment shown made from sheet metal, and attached to each other in an air-tight manner when assembled. The lower shell 133 and the upper shell 132 have differing shapes which are, however, both closely related to the shape of a right prism with a triangular base. The shape enclosure resembles in total the form of a parallelepiped which opposing faces are, however, curved in opposite directions.

A sidewall of the lower shell is penetrated by a bell mouth 142 connected to an exhaust system by a sound line 141. In the region of penetration, the bell mouth 142 is sealed air-tight with the lower shell 133. Inside the lower shell 133, the bell mouth 142 additionally supports itself against the lower shell 133 via three protrusions 143. These three protrusions 143 of the bell mouth 142 are arranged in a parting plane 102 located between the upper shell 132 and lower shell 133 such that openings remain between the bell mouth 142 and an inner wall of the lower shell 133 and upper shell 132 that enable an air flow inside the sound generator from the lower shell 133 into the upper shell 132.

The bell mouth 142 is connected to a voice coil loudspeaker's 102 loudspeaker basket 123 made from sheet metal in an air-tight manner.

The loudspeaker 102 comprises a permanent magnet 121 made of a neodymium-iron-boron alloy and a non-developable funnel-like membrane 122 made from synthetic material, with both being supported by the loudspeaker basket 123. The funnel-like membrane 122 is hereby at its base area at its radial outside in an air-tight manner connected to the loudspeaker basket 123 via an elastic surround 127 made of synthetic material. The top face of the funnel-like membrane 122 is at its center hermetically sealed by a cover cap 124.

Hence, the loudspeaker 102 hermetically seals off an opening of the bell mouth 142 located in the sound generator 103 from a volume enclosed by the upper shell 132 and the lower shell 133. Together with the bell mouth 142, the loudspeaker 102 thus divides the interior of the sound generator 103 into two portions separated hermetically from each other, with one of the portions being configured for a fluid communication with an exhaust system via the sound line 141, and the other portion being separated from the exhaust system by the membrane 122 of the loudspeaker 102. The upper shell 132 and the lower shell 133 are hereby sized such that the portion separated from the exhaust system by the membrane 122 of the loudspeaker 102, and thus the sealed off internal volume of the sound generator 103 corresponds to the 32-fold of the air volume displaced by the membrane 122 of the loudspeaker 102 upon maximum displacement of the membrane 122. In the embodiment shown, the sealed off internal volume of the sound generator 103 amounts to about 5696 $cm^3$ and the air volume displaced upon maximum displacement of the membrane 122 to about 178 $cm^3$.

For achieving a pressure equalization for the sealed off volume, the lower shell 133 comprises two pressure equalization valves (throttle valves) 136 which are configured as throttle valves and located in the recess 137 formed in the lower shell 133. The pressure equalization valves 136 allow a flow rate of 7.0 liters air per hour for a constant pressure difference of 4 millibar (400 Pascal) between their respective inlets and outlets, and are thus too slow for responding to pressure variations caused inside the sound generator 103 by oscillations of the loudspeaker's 102 membrane 122. It is noted that the constant pressure difference is only used for defining the flow capacity of the throttle valve, and that the pressure difference will vary during operation and be relieved continuously by the pressure equalization vales. Disposing the pressure equalization valves 136 in the recesses protects them from damage. The recesses are furthermore aligned to allow water to drain downwards.

A voice coil carrier 125 supporting a voice coil 126 is attached to membrane 122 in the region of the cover cap 124. The voice coil 126 is disposed in a magnetic field created by the permanent magnet 121. The permanent magnet 121 comprises corresponding bores hereto. The voice coil 126 is aligned radially in the bore by a centering spider 129. By supplying the voice coil 126 with an alternating current, the voice coil exerts a force onto the membrane 122 due to the Lorentz force and thus causes the membrane 122 to oscillate. Control wires 135 for supplying current to the voice coil 126 enter into the interior of the sound generator 103 through an air-tight cable feed-through 134 at the lower shell 133.

For providing enough space at the lower shell 133 above the loudspeaker basket 123 for disposing the pressure equalization valves 136 and the cable feed-through 134, the loudspeaker 102 is not placed in the parting plane 131 between the upper shell 132 and the lower shell 133, but is tilted with respect to said parting plane 131. In particular, a plane P perpendicular to an axis S of symmetry defined by the membrane 122 forms with the parting plane 131 in the embodiment shown an angle b of 12°. Furthermore, the axis S of symmetry forms an angle a of 35° with a bottom of the bell mouth 142.

Figure 3:
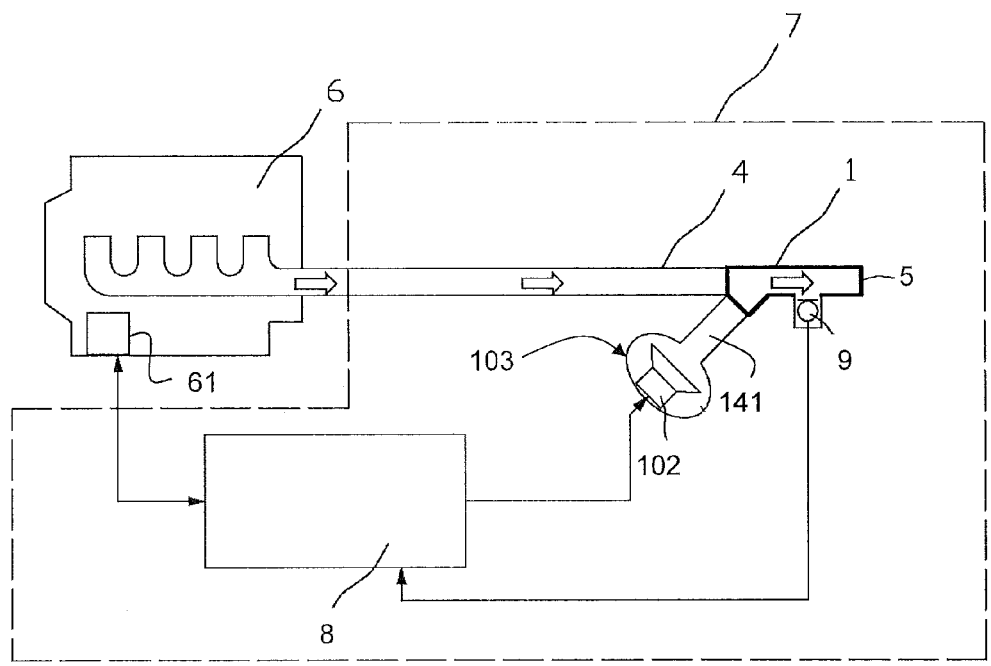
FIG. 3 is a schematic representation showing a block diagram of a system according to an embodiment of the invention for influencing sound waves propagating through exhaust systems of vehicles driven by internal combustion engines.

FIG. 3 is a schematic diagram that shows a system 7 for influencing sound waves propagating through exhaust systems of vehicles driven by internal combustion engines which uses the above sound generator 103.

The sound generator 103 is connected to a vehicle's exhaust system 4 in the region of a discharge opening (tailpipe) 5 by a Y-pipe 1 and a sound line 141. The exhaust gases traveling through the exhaust system 4 are discharged at the discharge opening 5 together with the sound generated by the sound generator 103.

An error microphone 9 having the form of a pressure sensor is provided at the Y-pipe 1. The error microphone 9 measures pressure variations and thus sound inside the Y-pipe 1 in a section downstream of a region in which the fluid communication between the exhaust system 9 and the sound generator 103 is effected. It is, however, noted that the error microphone 9 is only optional.

The flow direction of the exhaust gases traveling through the exhaust system 4 is indicated by arrows.

The loudspeaker 102 of the sound generator 103 and the error microphone 9 are electrically connected to a controller 8. The controller 8 is further connected to an engine control unit 61 of an internal combustion engine 6 via a CAN data bus. It is noted that the present invention is not limited to a CAN data bus.

The exhaust system 4 may further comprise at least one catalytic converter (not shown) disposed between the internal combustion engine 6 and the Y-pipe 1 for cleaning the exhaust gases emitted from the internal combustion engine 6 and traveling through the exhaust system 4.

The general mode of operation of the above system 7 for influencing sound waves propagating through exhaust systems of vehicles driven by internal combustion engines is as follows:

Based on the noise measured by the error microphone 9 and/or the operating parameters of the internal combustion engine 6 received via the CAN data bus, the controller 8 calculates, using a Filtered-x Least Means Squares (FxLMS) algorithm, control signals, each of which enables a desired influence on the sound originating from an operation of the internal combustion engine 6 and propagating through the interiors of the exhaust system 4 by applying sound artificially produced by the sound generator 103, and outputs these control signals to the loudspeaker 102 of the sound generator 103 via control wires 135.

Figure 4:
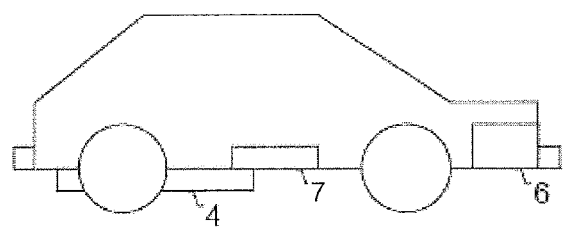
FIG. 4 is a schematic representation showing a motor vehicle having the system of FIG. 3 incorporated therein.

In the schematic representation of FIG. 4 a motor vehicle is shown, having an internal combustion engine 6, an exhaust system 4, and the above system 7 for influencing sound waves propagating through exhaust systems of vehicles driven by internal combustion engines. The sound generator and the loudspeaker of the anti-noise system are not expressly shown in FIG. 4.

For the sake of clarity, only those elements, components, and functions beneficial for an understanding of the present invention are shown in the Figures. Embodiments of the invention are, however, not limited to elements, components, and functions shown, but may contain further elements, components, and functions if necessary for their usage or range of functions.

While the disclosure has been described with respect to certain exemplary embodiments thereof, it is evident that many alternatives, modifications and variations will be apparent to those skilled in the art. Accordingly, the exemplary embodiments of the disclosure set forth herein are intended to be illustrative and not limiting in any way. Various changes may be made without departing from the spirit and scope of the present disclosure as defined in the following claims.

What is claimed is:

1. A sound generator for a system for influencing sound waves propagating through an exhaust system of a vehicle driven by an internal combustion engine, the sound generator comprising:
   an enclosure comprised of an upper shell and a lower shell;
   a bell mouth supported by the lower shell of the enclosure, the bell mouth penetrating the lower shell, and being configured for a fluid communication with the exhaust system; and
   a loudspeaker disposed in the enclosure and supported by the bell mouth, wherein:
      the lower shell of the enclosure supports the upper shell of the enclosure;
      the lower shell comprises an air-tight feed-through for a control line connected to the loudspeaker; and
      the bell mouth is an element different from the upper shell and the lower shell of the enclosure and provided in addition to the upper shell and the lower shell of the enclosure.

2. The sound generator of claim 1, wherein the pressure equalization valve is a throttle valve enabling a flow rate of more than 3.5 liters of air per hour and less than 10 liters of air per hour, for a constant pressure difference of 400 Pascal, wherein the lower shell comprises a pressure equalization valve located in a dimple.

3. The sound generator of claim 1, wherein the loudspeaker comprises:
   a loudspeaker basket;
   a membrane supported by the loudspeaker basket;
   a permanent magnet supported by the loudspeaker basket; and
   a voice coil supported by a voice coil carrier, the voice coil being disposed in a constant magnetic field created by the permanent magnet and being coupled to the membrane, and wherein the membrane has a rotationally symmetric shape.

4. The sound generator of claim 3, wherein a parting plane, between the upper shell and the lower shell of the enclosure, forms with a plane perpendicular to the axis of symmetry of the membrane an angle of more than 3° and less than 45°.

5. The sound generator of claim 1, wherein:
the bell mouth comprises at least two protrusions connected to the lower shell of the enclosure, or at least three protrusions connected to the lower shell of the enclosure; and
openings are formed between the protrusions of the bell mouth enabling air to flow from the lower shell of the enclosure into the upper shell of the enclosure.

6. The sound generator of claim 1, wherein the bell mouth is an element different from the upper shell and the lower shell of the enclosure and provided in addition to the upper shell and lower shell of the enclosure.

7. The sound generator of claim 1, wherein:
the loudspeaker is attached to the bell mouth such that it separates an internal volume of the bell mouth from an internal volume of the enclosure in an air-tight manner; and
the internal volume of the enclosure which is enclosed by the loudspeaker, the bell mouth, and the enclosure, corresponds to 10-fold to 100-fold a maximum air volume displaced by a membrane of the loudspeaker.

8. A sound generator for a system for influencing sound waves propagating through an exhaust system of a vehicle driven by an internal combustion engine, the sound generator comprising:
an enclosure comprised of an upper shell and a lower shell;
a bell mouth supported by the lower shell of the enclosure, the bell mouth penetrating the lower shell, and being configured for a fluid communication with the exhaust system; and
a loudspeaker disposed in the enclosure and supported by the bell mouth, the loudspeaker comprising a loudspeaker basket, a membrane supported by the loudspeaker basket, a permanent magnet supported by the loudspeaker basket, and a voice coil supported by a voice coil carrier, the voice coil being disposed in a constant magnetic field created by the permanent magnet and being coupled to the membrane, wherein:
the membrane has a rotationally symmetric shape defining an axis of symmetry of the membrane;
a parting plane, between the upper shell and the lower shell of the enclosure, forms with a plane perpendicular to the axis of symmetry of the membrane an angle of more than 3° and less than 45°.

9. The sound generator of claim 8, wherein the axis of symmetry of the membrane forms an angle with a bottom of the bell mouth of between 35° and 60°.

10. The sound generator of claim 8, wherein:
the bell mouth comprises at least two protrusions connected to the lower shell of the enclosure, or at least three protrusions connected to the lower shell of the enclosure; and
openings are formed between the protrusions of the bell mouth enabling air to flow from the lower shell of the enclosure into the upper shell of the enclosure.

11. The sound generator of claim 8, wherein the bell mouth is an element different from the upper shell and the lower shell of the enclosure and provided in addition to the upper shell and lower shell of the enclosure.

12. A sound generator for a system for influencing sound waves propagating through exhaust systems of vehicles driven by internal combustion engines, the sound generator comprising:
an enclosure comprised of an upper shell and a lower shell;
a bell mouth supported by the lower shell of the enclosure, the bell mouth penetrating the lower shell, and being configured for a fluid communication with the exhaust system; and
a loudspeaker disposed in the enclosure and supported by the bell mouth, the loudspeaker comprising a loudspeaker basket, a membrane supported by the loudspeaker basket, a permanent magnet supported by the loudspeaker basket, and a voice coil supported by a voice coil carrier, the voice coil being disposed in a constant magnetic field created by the permanent magnet and being coupled to the membrane, wherein:
the loudspeaker is attached to the bell mouth such that it separates an internal volume of the bell mouth from an internal volume of the enclosure in an air-tight manner; and
the internal volume of the enclosure which is enclosed by the loudspeaker, the bell mouth, and the enclosure, corresponds to 10-fold to 100-fold of an air volume being at a maximum displaced by a membrane of the loudspeaker.

13. The sound generator of claim 12, wherein:
the membrane of the loudspeaker is funnel shaped or dome shaped, or has a non-developable funnel-like shape, with the top or top face of the funnel shaped membrane or the membrane with the non-developable shape facing towards the permanent magnet or the geometric center of the dome-like membrane facing towards the permanent magnet; and
the membrane is coupled to the loudspeaker basket by an air-tight surround.

14. The sound generator of claim 12, wherein:
the bell mouth comprises at least two protrusions connected to the lower shell of the enclosure, or at least three protrusions connected to the lower shell of the enclosure; and
openings are formed between the protrusions of the bell mouth enabling air to flow from the lower shell of the enclosure into the upper shell of the enclosure.

15. The sound generator of claim 12, wherein the bell mouth is an element different from the upper shell and the lower shell of the enclosure and provided in addition to the upper shell and lower shell of the enclosure.

16. A system for influencing sound waves propagating through exhaust systems of vehicles driven by internal combustion engines, the system comprising a controller and a sound generator, the sound generator comprising:
an enclosure comprised of an upper shell and a lower shell;
a bell mouth supported by the lower shell of the enclosure, the bell mouth penetrating the lower shell, and being configured for a fluid communication with the exhaust system; and
a loudspeaker disposed in the enclosure and supported by the bell mouth, wherein:
the lower shell of the enclosure supports the upper shell of the enclosure; and
the lower shell comprises an air-tight feed-through for a control line connected to the loudspeaker;
the bell mouth is an element different from the upper shell and the lower shell of the enclosure and provided in addition to the upper shell and the lower shell of the enclosure;

the at least one loudspeaker of the at least one sound generator is connected to the controller;

the controller is configured to generate at least one control signal and to output the control signal to the at least one loudspeaker, with the control signal being adapted to cancel sound inside the exhaust system at least partially or completely upon the at least one loudspeaker being operated with said control signal.

17. A motor vehicle comprising an internal combustion engine having an engine control unit, an exhaust system in fluid communication with the internal combustion engine and a sound influencing system for influencing sound waves propagating through the exhaust system, the sound influencing system comprising a controller and a sound generator, the sound generator comprising:

an enclosure comprised of an upper shell and a lower shell;

a bell mouth supported by the lower shell of the enclosure, the bell mouth penetrating the lower shell, and being configured for a fluid communication with the exhaust system; and a loudspeaker disposed in the enclosure and supported by the bell mouth, wherein:

the lower shell of the enclosure supports the upper shell of the enclosure;

the lower shell comprises an air-tight feed-through for a control line connected to the loudspeaker;

the bell mouth is an element different from the upper shell and the lower shell of the enclosure and provided in addition to the upper shell and the lower shell of the enclosure;

the at least one loudspeaker of the at least one sound generator is connected to the controller;

the controller is configured to generate at least one control signal and to output the control signal to the at least one loudspeaker, with the control signal being adapted to cancel sound inside the exhaust system at least partially or completely upon the at least one loudspeaker being operated with said control signal;

the at least one sound generator of the system is in fluid communication with the exhaust system; and the controller of the system is further connected to the engine control unit of the internal combustion engine of the vehicle.

18. A system for influencing sound waves propagating through exhaust systems of vehicles driven by internal combustion engines, the system comprising a controller and a sound generator, the sound generator comprising:

an enclosure comprised of an upper shell and a lower shell;

a bell mouth supported by the lower shell of the enclosure, the bell mouth penetrating the lower shell, and being configured for a fluid communication with the exhaust system; and a loudspeaker disposed in the enclosure and supported by the bell mouth, the loudspeaker comprising a loudspeaker basket, a membrane supported by the loudspeaker basket, a permanent magnet supported by the loudspeaker basket, and a voice coil supported by a voice coil carrier, the voice coil being disposed in a constant magnetic field created by the permanent magnet and being coupled to the membrane, wherein:

the membrane has a rotationally symmetric shape defining an axis of symmetry of the membrane; and a parting plane, between the upper shell and the lower shell of the enclosure forms with a plane perpendicular to the axis of symmetry of the membrane an angle of more than 3° and less than 45°;

the loudspeaker is connected to the controller; and the controller is configured to generate at least one control signal and to output the control signal to the at least one loudspeaker, with the control signal being adapted to cancel sound inside the exhaust system at least partially or completely upon the at least one loudspeaker being operated with said control signal.

19. A system for influencing sound waves propagating through exhaust systems of vehicles driven by internal combustion engines, the system comprising a controller and a sound generator, the sound generator comprising:

an enclosure comprised of an upper shell and a lower shell;

a bell mouth supported by the lower shell of the enclosure, the bell mouth penetrating the lower shell, and being configured for a fluid communication with the exhaust system; and a loudspeaker disposed in the enclosure and supported by the bell mouth, the loudspeaker comprising a loudspeaker basket, a membrane supported by the loudspeaker basket, a permanent magnet supported by the loudspeaker basket, and a voice coil supported by a voice coil carrier, the voice coil being disposed in a constant magnetic field created by the permanent magnet and being coupled to the membrane, wherein:

the loudspeaker is attached to the bell mouth such that it separates an internal volume of the bell mouth from an internal volume of the enclosure in an air-tight manner; and the internal volume of the enclosure which is enclosed by the loudspeaker, the bell mouth, and the enclosure, corresponds to a 10-fold to 100-fold a maximum air volume displaced by a membrane of the loudspeaker;

the loudspeaker of the at least one sound generator is connected to the controller;

the controller is configured to generate at least one control signal and to output the control signal to the at least one loudspeaker, with the control signal being adapted to cancel sound inside the exhaust system at least partially or completely upon the at least one loudspeaker being operated with said control signal.

20. The system of claim 16, wherein the lower shell comprises a pressure equalization valve located in a dimple.

21. The motor vehicle of claim 17, wherein the lower shell comprises a pressure equalization valve located in a dimple.

22. A sound generator for a system for influencing sound waves propagating through an exhaust system of a vehicle driven by an internal combustion engine, the sound generator comprising:

an upper shell;

a lower shell comprising a lower shell inner surface, said lower shell inner surface defining a lower shell interior space, said upper shell and said lower shell defining an enclosure;

a bell mouth supported by said lower shell, at least a portion of said bell mouth being arranged in said lower shell interior space, said at least said portion of said bell mouth being located at a spaced location from said lower shell inner surface, said bell mouth being in fluid communication with the exhaust system; and a loudspeaker disposed in said enclosure, said loudspeaker being supported via said bell mouth, wherein:

the lower shell of the enclosure supports the upper shell of the enclosure;

the lower shell comprises an air-tight feed-through for a control line connected to the loudspeaker, said air-tight feed-through defining at least a portion of a cable through path, at least a portion of said cable through path being located at a position above said bell mouth.

23. A sound generator for a system for influencing sound waves propagating through an exhaust system of a vehicle driven by an internal combustion engine, the sound generator comprising:
- an upper shell;
- a lower shell, said upper shell and said lower shell defining an enclosure;
- a bell mouth supported by the lower shell of the enclosure, the bell mouth penetrating the lower shell, and said bell mouth being configured for a fluid communication with the exhaust system; and
- a loudspeaker disposed in the enclosure and supported by the bell mouth, wherein:
  - the lower shell of the enclosure supports the upper shell of the enclosure;
  - the lower shell comprises an air-tight feed-through for a control line connected to the loudspeaker, said air-tight feed-through defining at least a portion of a cable through path, at least a portion of said cable through path being located at a position above said bell mouth; and
  - the bell mouth is a structure different and distinct from the upper shell and the lower shell of the enclosure.

* * * * *